United States Patent [19]
Yamamori

[11] Patent Number: 5,225,453
[45] Date of Patent: Jul. 6, 1993

[54] POLYOL COMPOSITIONS FOR PRODUCING RIGID POLYURETHANE FOAMS

[75] Inventor: Satofumi Yamamori, Kawabe, Japan

[73] Assignee: Takeda Chemical Industries, Ltd., Osaka, Japan

[21] Appl. No.: 443,164

[22] Filed: Nov. 30, 1989

[30] Foreign Application Priority Data

Nov. 30, 1988 [JP] Japan ................................. 63-305028
Nov. 30, 1988 [JP] Japan ................................. 63-305029

[51] Int. Cl.$^5$ ............................................. C08G 18/48
[52] U.S. Cl. ..................................... 521/137; 521/131; 521/170; 521/174
[58] Field of Search ................ 521/65, 137, 131, 170, 521/174; 252/182.25, 182.27

[56] References Cited

U.S. PATENT DOCUMENTS 4,299,924 11/1981 Nomura et al. ...................... 521/131
4,542,165 9/1985 Kumata et al. ...................... 521/131

Primary Examiner—John Kight, III
Assistant Examiner—John M. Cooney, Jr.
Attorney, Agent, or Firm—Wenderoth, Lind & Ponack

[57] ABSTRACT

A polyol composition for producing rigid polyurethane foams is disclosed which contains adducts of ethylene oxide or propylene oxide or both to resorcinol, catechol, cresorcinol or their homologues having two hydroxyls at the ortho or meta positions to each other, or adducts of ethylene oxide or propylene oxide or both to bisphenol A in combination with a second polyol and a low molecular weight glycol as a crosslinking agent.

The resultant rigid polyurethane foams have such a high heat resistance as to stand the use over a long period under high temperature circumstances.

7 Claims, No Drawings

POLYOL COMPOSITIONS FOR PRODUCING RIGID POLYURETHANE FOAMS

This invention relates to a polyol composition for producing rigid polyurethane foams which are in particular of high heat resistance and durability as well as of high mechanical strength.

Rigid polyurethane foams have heretofore been produced by using relatively low molecular weight polyols of high functionality as polyol components. For instance, a method is disclosed in Japanese Patent Publication No. 57-45770, wherein polyols which contain ethylene oxide or propylene oxide adducts to six to eight functional polyhydric alcohols such as sorbitol or sucrose and ethylene oxide or propylene oxide adducts to glycerine are used to improve toughness of rigid foams.

Although, these known rigid polyurethane foams are of good mechanical properties as they are produced, but they are of insufficient heat resistance, so that when they are used under high temperature circumstances, they lose their strength within a short period of time, and hence they are short of durability.

Therefore, a number of rigid polyurethane foams have hitherto been proposed where in an adduct of alkylene oxides to bisphenol A is used as a polyol component. For instance, a rigid polyurethane foam is known which is prepared using such a polyol derived from the addition of alkylene oxides such as ethylene oxide or propylene oxide to bisphenol A having a hydroxyl value of not less than 200, as is disclosed in Japanese Patent-laid open No. 56-34721. A further rigid polyurethane foam is also known which is prepared using 2,2-bis[4-(2-hydroxypropoxy]phenyl)propane and adducts of alkyleneoxides to aromatic polyamino compounds such as 2,6-tolylenediamine as polyol components as is disclosed in Japanese Patent Laid-open No. 59-47223. Further, the co-use of adducts of alkylene oxides to aromatic polyhydric compounds such as hydroquinone as polyol components is made reference to therein.

These prior rigid polyurethane foams are improved to an extent in heat resistance, for example, from the standpoint of thermal deflection temperature or glass transition temperature, but they have been still found not to withstand the use over a long period under high temperature circumstances.

It is, therefore, an object of the invention to provide a polyol composition for use in the production of rigid polyurethane foams which have such a high heat resistance as to withstand the use over a long period under high temperature circumstances as well as a high mechanical strength and toughness.

In accordance with the invention, there is provided a polyol composition for producing rigid polyurethane foams which comprises a polyol component which contains a polyol having the general formula of

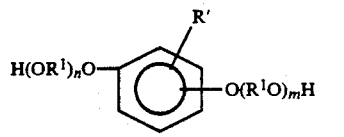 (I)

wherein $R^1$ independently represents an ethylene group or a propylene group, and the two groups containing $R^1$ are in the meta or ortho position to each other; m and n are numerals more than 1, respectively, and their sum is in the range of 3-40; and R' represents a hydrogen or a lower alkyl group, in amounts of 20-50% by weight based on the polyol component in the polyol composition.

The above polyol may be produced by adding ethylene oxide or propylene oxide or both to resorcinol, catechol, cresorcinol or their homologues having two hydroxyls at the ortho or para positions to each other. The polyol is obtained usually as mixtures which have varied values of m and n. In the above formula, R' is a hydrogen or a lower alkyl group such as methyl, ethyl, propyl or butyl, and preferably R' is a hydrogen.

It is necessary that in the above formula (I), m and n are numerals of more than 1, respectively, and their sum, m+n, i.e., the moles of the alkylene oxides represented by —RO$^1$— are in the range of 3-40. When the moles of the alkylene oxides in the adduct are less than 3, the resultant rigid polyurethane foams are of high heat resistance, but of insufficient toughness, so that they may not be put to practical use as rigid foam products. On the other hand, when the moles of the alkylene oxides in the adduct are more than 40, the resultant rigid polyurethane foams are inferior in mechanical strength, in particular, in flexural strength, and in heat resistance as well.

It is convenient to designate the properties of polyols used by hydroxyl values in the production of polyurethane foams, and in this regard, the above polyol has preferably a hydroxyl value of 50-480.

The above polyol is contained in the polyol composition in amounts of 20-50% by weight based on the polyol component in the composition. When the polyol is contained in amounts of less than 20% by weight based on the polyol component, the resultant rigid polyurethane foams are still inferior in toughness and heat resistance. On the other hand, when the polyol is contained in amounts of more than 50% by weight based on the polyol component, the resultant rigid polyurethane foams are too small in hardness to use them as practical products. Preferably the polyol is contained in the polyol composition in amounts of 25-45% by weight based on the polyol component in the polyol composition.

The polyol composition may contain any second polyol, in addition to the aforesaid first polyol (I). A variety of polyols may be used as the second polyol, for example, polyester polyols, polyether polyols, polyester polyether polyols or grafted polyols.

More specifically, the polyester polyols may be exemplified by condensation products of glycols such as ethylene glycol, diethylene glycol, propylene glycol, butylene glycol, pentane glycol or hexane glycol, or polyhydic alcohols such as trimethylolpropane or glycerine, with dicarboxylic acids such as adipic acid, sebacic acid, isophthalic acid or phthalic acid.

The polyether polyols used include, for example, adducts of alkylene oxides such as ethylene oxide, propylene oxide or butylene oxide, to polyhydic compounds such as ethylene glycol, propylene glycol, diethylene glycol, dipropylene glycol, glycerine, trimethylolpropane, triethanolamine, pentaerythritol, diglycerine, sorbitol or sucrose. The polyether polyols used may further include adducts of such alkylene oxides as above to ammonia or amine compounds such as monoethanolamine, diethanolamine, ethylenediamine, 4,4'-diaminodiphenylmethane or tolylenediamine.

The polyester polyether polyols used may be prepared by the reaction of such polyether polyols as above with such dicarboxylic acid as before described.

The grafted polyols used may be prepared by grafting monomers such as styrene or acrylonitrile onto the polyether polyols as before described.

These second polyols may be used singly or as mixtures of two or more.

Crosslinking agents may be contained in the polyol composition. The crosslinking agent usable may be exemplified by glycols such as ethylene glycol, propylene glycol, diethylene glycol, triethylene glycol, dipropylene glycol, trimethyleneglycol, 1,3-butanediol or 1,4-butanediol; alkanolamines such as diethanolamine or triethanolamine; aliphatic polyamines such as ethylenediamine, diethylenetriamine or triethylenetetramine; or aromatic diamines such as methylene-o-chloroaniline, 4,4'-diaminodiphenylmethane, 2,4-tolylenediamine or 2,6-tolylenediamine. These cross-linking agents may be used usually in amounts of 5-15 parts by weight in relation to 100 parts by weight of the polyols used in the polyol composition.

There is provided a further polyol composition for use in the production of rigid polyurethane foams which comprises polyol components which contain:
(a) a first polyol having the general formula of

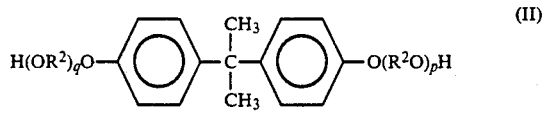

wherein $R^2$ independently represents an ethylene group or a propylene group, p and q are numeral of more than 1, respectively, and their sum is in the range of 3-40, and having a hydroxyl value of 50-170, in amounts of 25-45% by weight based on the polyol component in the polyol composition; and (b) a second polyol having a hydroxyl value of not less than 400; and (c) a glycol of 2-6 carbons as a crosslinking agent in amounts of 5-15 parts by weight in relation to 100 parts by weight of the polyol component in the polyol composition.

The above first polyol (II) used in the second polyol composition of the invention may be produced by adding ethylene oxide or propylene oxide or both to bisphenol A or 2,2-bis(4'-hydroxyphenyl)propane, and the polyol is usually obtained as mixtures which has varied values of p and q.

It is necessary that in the above formula (II), p and q are integers of more than 1, respectively, and their sum or p+q, i.e., the moles of the alkylene oxides represented by —$R^2O$— are in the range of 3-40 on account of the same reasons as hereinbefore described. It is further necessary that the first polyol has a hydroxyl value of 50-170 so that the resultant rigid polyurethane foams have such a high heat resistance as to stand long period use under high temperature circumstances.

In the second polyol composition of the invention, the first polyol is contained in the composition in amounts of 25-45% by weight based on the polyol component in the polyol composition. When the first polyol is contained in amounts of less than 25% by weight based on the polyol component in the composition, the resultant rigid polyurethane foams are still inferior in toughness and heat resistance. On the other hand, when the first polyol is contained in amounts of more than 45% by weight based on the polyol component, the resultant rigid polyurethane foams are too small in hardness to use them as practical products. Preferably the first polyol is contained in the polyol component in amounts of 30-40% by weight.

The second polyol composition of the invention contains the second polyol together with the first polyol. As these second polyols, there may be used such polyester polyols, polyether polyols, polyester polyether polyols or grafted polyols as hereinbefore described. However, the second polyol should have a hydroxyl value of not less than 400 when used together with the second polyol (II) to provide rigid polyurethane foams which are durable in use under high temperature circumstances.

The second polyol composition of the invention contains a glycol of 2-6 carbons as a crosslinking agent in amounts of 5-15 parts by weight in relation to 100 parts by weight of the polyol components contained in the polyol composition so that the resultant rigid polyurethane foams have such a high heat resistance as described hereinbefore. The crosslinking agent usable includes, for example, ethylene glycol, propylene glycol, diethylene glycol, triethylene glycol, dipropylene glycol, trimethyleneglycol, 1,3-butanediol or 1,4-butanediol, with ethylene glycol most preferred.

The polyol compositions of the invention, either the first or the second, are used together with polyisocyanates in the production of rigid polyurethane foams. The polyisocyanates used in the invention are not specifically limited, but a variety of aromatic, aliphatic or alicyclic polyisocyanates may be suitably used.

Thus, the polyisocyanates used include, for example, 2,4-tolylene diisocyanate, 2,6-tolylene diisocyanate, mixtures of 2,4-/2,6-tolylene diisocyanate such as in ratios of 80/20 (TDI-80) or 65/35 (TDI-65), crude tolylene diisocyanates, diphenylmethane diisocyanate, polyphenylenepolymethylene polyisocyanate known as crude MDI, dianisidine diisocyanate, toluidine diisocyanate, xylylene diisocyanate, bis(2-isocyanatoethyl)-fumarate, bis(2-isocyanatoethyl)maleate, bis(2-isocyanatoethyl)carbonate, 1,6-hexamethylene diisocyanate, 1,4-tetramethylene diisocyanate, 1,10-decamethylene diisocyanate, cumene-2,4-diisocyanate, 4-methoxy-1,3-phenylene diisocyanate, 4-bromo-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4'-diisocyanatodiphenyl ether, bis-5,6-(isocyanatoethyl)bicyclo[2,2,1]heptene-2, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 1,4-anthracene diisocyanate, 2,5-fluorene diisocyanate, 1,8-naphthalene diisocyanate, 2,6-diisocyanatobenzofuran, 2,4,5-toluene triisocyanate, their carbodiimide modified products, biuret compounds, dimers, trimers, and their isocyanate terminated prepolymers which are obtained by the reaction of the polyisocyanates with compounds having active hydrogens therein. These modified polyisocyanates are well known in the production of polyurethane foams. These polyisocyanates may be used singly or as mixtures of two or more.

Among these polyisocyanates, however, aromatic ones are preferred from the standpoint of mechanical strength and hardness of the resulting rigid polyurethane foams.

Conventional methods may be employed to produce rigid polyurethane foams. The polyol composition is used in such a manner that an equivalence ratio of isocyanate groups in the polyisocyanates used to hydroxyl groups in the polyol composition, i.e., NCO/OH ratio or isocyanate index, is preferably in the range of 0.8–1.5, more preferably of 0.9–1.1.

Blowing agents and catalysts are used together with the polyol composition and polyisocyanates in the production of rigid polyurethane foams, as well known in the art, and when desired also surfactants, fire retardants, colorants, and the like.

There may be used any known catalyst, such as amine or organometal catalysts. More specifically, the amine catalysts include, for example, triethylamine, tripropylamine, tributylamine, trioctylamine, hexadecyldimethylamine, N-methylmorpholine, N-ethylmorpholine, N-octadecylmorpholine, monoethanolamine, diethanolamine, triethanolamine, triisopropanolamine, N-methyldiethanolamine, N,N-dimethyldiethanolamine, diethylenetriamine, N,N,N',N'-tetramethylethylenediamine, N,N,N',N'-tetramethylpropylenediamine, N,N,N',N'-tetramethyl-1,3-butanediamine, N,N,N',N'-tetramethylhexamethylenediamine, bis[2-(N,N-dimethylamino)ethyl]ether, N,N-dimethylbenzylamine, N,N-dimethylcyclohexylamine, N,N,N',N'-pentamethyldiethylenetriamine, triethylenediamine, carboxylic acid salts of amines such as formate of triethylenediamine, and oxyalkylene adducts to primary or secondary amines.

The organometal catalysts used include, for example, stannous acetate, stannous octanoate, stannous oleate, stannous laurate, dibutyltin dichloride, lead octanoate, lead naphthenate, nickel naphthenate and cobalt naphthenate.

The catalysts may be used singly or as mixtures in amounts usually of 0.001–5 parts by weight in relation to 100 parts by weight of compounds having active hydrogens therein used.

The blowing agents used include water and halogenated hydrocarbons known in the art, such as trichlorofluoromethane, dichlorodifluoromethane, methylene chloride, trichlorotrifluoroethane, dibromotetrafluoroethane, trichloroethane, and aliphatic hydrocarbons such as pentane or n-hexane. The blowing agents may also be used singly or as mixtures. Water is used in amounts usually of 0.05–2.0% by weight, preferably of 0.2–1.0% by weight, based on the total amount of the compounds having active hydrogens therein including the polyols used and the polyisocyanates used. The halogenated hydrocarbons are used in amounts usually of 0–12% based on the total amount of the compounds having active hydrogens therein including the polyols used and the polyisocyanates used.

As surfactants, there may be used organosilicone surfactants, as well known in the art. However, it is necessary to form microcells to prevent the generation of voids in the resultant foam products, and from this standpoint, the use of L-520, L-532, L-540, L-544, L-550, L-3550, L-3600, L-3601, L-5305, L-5307, L-5309, L-5710, L-5720 or L-5740M by Nippon Unicar, SH-190, SH-192, SH-194, SH-200, SRX-274C, SF-2961, SF-2962, SRX-280A or SRX-294A by Toray Silicone, F-114, F-121, F-122, F-220, F-230, F-258, F-260B, F-317, F-341, F-601 or F-335 by Shinetsu Silicone is preferred. These foam stabilizers are used in amounts of 0.25–2 parts in relation to 100 parts by weight of the total of the compounds which have active hydrogens including the polyols and the polyisocyanates used.

There may be used a RIM method or an injection method with low or high pressure foaming machines. Usually molds are maintained at temperatures of 30°–70° C., preferably of 35°–60° C., into which the polyol composition, the polyisocyanates and the other additives as described hereinbefore are injected at temperatures of 20°–40° C., preferably of 25°–35° C. The so-called pack ratio, a ratio of density of foams when free-foamed to density of foams as molded articles, is usually in the range of 1–5, preferably of 1.5–3.5. The resultant rigid polyurethane foams have a density of 0.08–0.4 g/cm$^3$, preferably of 0.15–0.35 g/cm$^3$.

The invention will now be described more specifically with reference to examples, however, the invention is not limited thereto.

Reference Example 1

An amount of 3 kg of resorcinol was placed in a pressure reactor provided with a thermometer and a stirrer, and there were added thereto 30 g of potassium hydroxide flake. The inside of the reactor was displaced with nitrogen, and the mixture was heated to 120°–130° C. to melt the potassium hydroxide.

While maintaining the temperature of the mixture at 110°–130° C., 24.4 kg of ethylene oxide were added to the mixture over eight hours, and then the mixture was stirred for another one hour at the temperature. A small amount of unreacted ethylene oxide remained in the reactor was then stripped with nitrogen.

The reaction mixture was cooled to 90°–110° C., and small amounts of water and 200 g of synthetic magnesium silicate were added to the reaction mixture, and then the mixture was stirred for about one hour. Thereafter, the magnesium silicate was removed by filtration, and the residuals were dehydrated, followed by the addition thereto of 27 g of di-t-butylhydroxytoluene.

The thus obtained polyol was a pale yellow viscous liquid containing 0.02% of water. The polyol was found to have a hydroxyl value of 111 and a pH of 6.9, and contain 20.2 moles of ethylene oxide added per mole of resorcinol.

Reference Example 2

An amount of 3 kg of catechol was placed in the same pressure reactor as in the Reference Example 1 together with 45 g of potassium hydroxide flake. After melting the potassium hydroxide, nitrogen was blown into the reactor under reduced pressures to dehydrate the mixture.

An amount of 7 kg of propylene oxide was first added to the mixture over three hours, and then 10 kg of ethylene oxide over seven hours. Thereafter, the reaction mixture was worked up in the same manner as in the Reference Example 1, to provide a polyol as a pale yellow viscous liquid containing 0.03% of water. The polyol was found to have a hydroxyl value of 157 and a pH of 6.8, and contain 8.4 moles of ethylene oxide added and 4.4 moles of propylene oxide added per mole of catechol.

Examples 1 and 2 and Comparative Example 1

Compositions were prepared of which components are shown in the Table 1. The compositions were injected into molds of iron having a molding space of 1000 mm×250 mm×10 mm, and foamed under heating at 50°±5° C. for three minutes, to provide sheets of rigid polyurethane foams. The properties of the foams are shown in the Table 1.

The polyols and polyisocyanates used were as follows.

Polyol A: propylene oxide adducts to sucrose/glycerine of a hydroxyl value of 460;
Polyol B: ethylene oxide adducts to trimethylolpropane of a hydroxyl value of 920;
Polyol C: ethylene oxide adducts to resorcinol of a hydroxyl value of 111 as obtained in the Reference Example 1; and
Polyol D: ethylene oxide/propylene oxide adducts to catechol of a hydroxyl value of 157 as obtained in the Reference Example 2. Polyisocyanate: polyphenylene polymethylene polyisocyanate (Millionate MR-200 by Nippon Polyurethane Kogyo K. K.).

The test specimens of 13 mm×110 mm×10 mm (thick) and 30×30×10 mm (thick) were prepared. With the former flexural strength and modulus were measured with a span of 50.8 mm, while with the latter compressive strength was measured by compressing the specimens by 30% in the direction of thickness. The results are shown in the Table 1 as properties as produced.

The specimens were left standing at 100° C. for 1000 hours, and then flexural strength, flexural modulus and compressive strength were measured in the same manner as above. The results are shown in the Table 1 as properties after durability test.

As seen, the foams according to the invention are well-balanced in strength and toughness, but also of high heat resistance, and hence of high durability.

TABLE 1

|  | Examples | | Comparative |
|---|---|---|---|
|  | 1 | 2 | 1 |
| COMPOSITIONS* | | | |
| Polyol A | 40 | 40 | 100 |
| Polyol B | 30 | 30 | — |
| Polyol C | 30 | — | — |
| Polyol D | — | 30 | — |
| Ethylene glycol | 10 | 10 | — |
| Water | 1.0 | 1.0 | 1.0 |
| Freon-11 | 6.0 | 6.0 | 6.0 |
| Dabco 33LV | 0.3 | 0.3 | 0.3 |
| F-335 | 1.0 | 1.0 | 1.0 |
| Isocyanate Index | 1.05 | 1.05 | 1.05 |
| FOAMS | | | |
| As Produced | | | |
| Density (g/cm$^3$) | 0.2 | 0.2 | 0.2 |
| Compression strength (kg/cm$^2$) | 19.8 | 19.6 | 22.4 |
| Flexural modulus (kg/cm$^2$) | 1050 | 1090 | 1240 |
| Flexural strength (kg/cm$^2$) | 72 | 73 | 76 |
| After Durability Test | | | |
| Compression strength (kg/cm$^2$) | 20.4 | 19.4 | 13.6 |
| Flexural modulus (kg/cm$^2$) | 1096 | 1110 | 740 |
| Flexural strength (kg/cm$^2$) | 76 | 74 | 41 |

Notes: *parts by weight

Reference Example 3

An amount of 5 kg of ethylene oxide adducts (2 moles) to bisphenol A (Rika Resin EO-20 by Shin-Nihon Rika K.K.) was placed in the same pressure reactor as in the Reference Example 1, and there were added thereto 50 g of potassium hydroxide flake. The inside of the reactor was displaced with nitrogen, and the mixture was heated to 120°–130° C. to melt the potassium hydroxide.

While maintaining the temperature of the mixture at 110°–130° C., 11.0 kg of ethylene oxide were added to the mixture over three hours, and then the mixture was stirred for another one hour at the temperature. A small amount of unreacted ethylene oxide remained in the reactor was then stripped with nitrogen.

The reaction mixture was cooled to 90°–110° C., and small amounts of water and 250 g of synthetic magnesium silicate were added to the reaction mixture, and then the mixture was stirred for about one hour. Thereafter, the magnesium silicate was removed by filtration, and the residuals were dehydrated, followed by the addition thereto of 16 g of di-t-butylhydroxytoluene.

The thus obtained polyol was a pale yellow viscous liquid containing 0.02% of water. The polyol was found to have a hydroxyl value of 109 and a pH of 6.8, and contain 17.8 moles of ethylene oxide added per mole of bisphenol A.

Reference Example 4

An amount of 10 kg of the same ethylene oxide adducts (2 moles) to bisphenol A and 150 g of potassium hydroxide flake were placed in the same pressure reactor as in the Reference Example 1. After melting the potassium hydroxide, nitrogen was blown into the reactor under reduced pressures to dehydrate the mixture.

An amount of 6.4 kg of propylene oxide was first added to the mixture over three hours, and then 6.3 kg of ethylene oxide over five hours. Thereafter, the reaction mixture was worked up in the same manner as in the Reference Example 1, to provide a polyol as a pale yellow viscous liquid containing 0.04% of water. The polyol was found to have a hydroxyl value of 158 and a pH of 6.9, and contain 6.5 moles of ethylene oxide added and 3.5 moles of propylene oxide added per mole of bisphenol A.

Examples 3 and 4

Compositions were prepared of which components are shown in the Table 2. Using the compositions, sheets of rigid polyurethane foams were prepared in the same manner as in the previous examples. The properties of the foams are shown in the Table 2.

The polyols A and B, and the polyisocyanate used are the same as before described. Polyol E: ethylene oxide adducts to bisphenol A of a hydroxyl value of 109 as obtained in the Reference Example 3; and Polyol F: ethylene oxide/propylene oxide adducts to bisphenol A of a hydroxyl value of 158 as obtained in the Reference Example 4.

As seen, the foams according to the invention are well-balanced in strength and toughness, but also of high heat resistance, and hence of high durability.

TABLE 2

|  | Examples | |
|---|---|---|
|  | 3 | 4 |
| COMPOSITIONS* | | |
| Polyol A | 40 | 40 |
| Polyol B | 30 | 30 |
| Polyol E | 30 | — |
| Polyol F | — | 30 |
| Ethylene glycol | 10 | 10 |
| Water | 1.0 | 1.0 |
| Freon-11 | 6.0 | 6.0 |
| Dabco 33LV | 0.3 | 0.3 |
| F-335 | 1.0 | 1.0 |

TABLE 2-continued

| | Examples | |
|---|---|---|
| | 3 | 4 |
| Isocyanate Index | 1.05 | 1.05 |
| FOAMS | | |
| As Produced | | |
| Density (g/cm³) | 0.2 | 0.2 |
| Compression strength (kg/cm²) | 20.3 | 20.0 |
| Flexural modulus (kg/cm²) | 1110 | 1120 |
| Flexural strength (kg/cm²) | 76 | 76 |
| After Durability Test | | |
| Compression strength (kg/cm²) | 21.1 | 19.5 |
| Flexural modulus (kg/cm²) | 1180 | 1200 |
| Flexural strength (kg/cm²) | 79 | 76 |

Notes: *parts by weight

What is claimed is:

1. A method of producing a rigid polyurethane foam which comprises reacting a polyol component which contains a polyol having the formula of

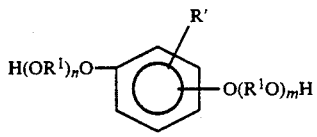

wherein $R^1$ independently represents an ethylene group or a propylene group, and the two groups containing $R^1$ are in the meta or ortho position to each other; m and n are numerals more than 1, respectively, and their sum is in the range of 3-40; and R' represents a hydrogen or a lower alkyl group, in amounts of 20-50% by weight based on the polyol component in the polyol composition, with a polyisocyanate in the presence of a crosslinking agent, a catalyst and a blowing agent.

2. The method as claimed in claim 1 wherein the polyol is adduct of ethylene oxide or propylene oxide or both to resorcinol, catechol, cresorcinol or their homologues having two hydroxyls at the ortho or meta positions.

3. A method of producing a rigid polyurethane foam which comprises reacting a polyol component which contains:

(a) a first polyol having the formula of

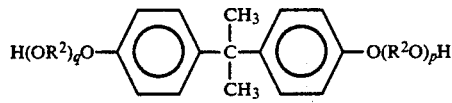

wherein $R^2$ independently represents an ethylene group or a propylene group, p and q are numerals of more than 1, respectively, and their sum is in the range of 3-40, and having a hydroxyl value of 50-170, in amounts of 25-45% by weight based on the polyol component in the polyol composition; and (b) a second polyol having a hydroxyl value of not less than 400; and (c) a glycol of 2-6 carbons as a crosslinking agent in amounts of 5-15 parts by weight in relation to 100 parts by weight of the polyol component in the polyol composition, with a polyisocyanate in the presence of a crosslinking agent, a catalyst and a blowing agent.

4. The polyol composition as claimed in claim 3 wherein the second polyol has a hydroxyl value of 400-1000.

5. The polyol composition as claimed in claim 3 wherein the crosslinking agent is ethylene glycol.

6. A rigid polyurethane foam comprising the reaction product of a polyol component which contains a polyol having the formula of

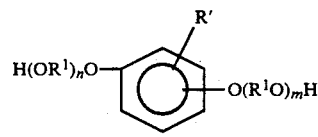

wherein $R^1$ independently represents an ethylene group or a propylene group, and the two groups containing $R^1$ are in the meta or ortho position to each other; m and n are numerals more than 1, respectively, and their sum is in the range of 3-40; and R' epresents a hydrogen or a lower alkyl group, in amounts of 20-50% by weight based on the polyol component in the polyol composition, with a polyisocyanate in the presence of a crosslinking agent, a catalyst and a blowing agent.

7. A rigid polyurethane foam comprising the reaction product of polyol components which contain:

(a) a first polyol having the formula of

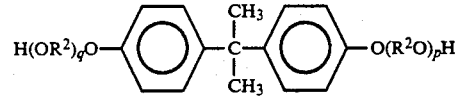

wherein $R^2$ independently represents an ethylene group or a propylene group, p and q are numerals of more than 1, respectively, and their sum is in the range of 3-40, and having a hydroxyl value of 50-170, in amounts of 25-45% by weight based on the polyol component in the polyol composition; and (b) a second polyol having a hydroxyl value of not less than 400, and (c) a glycol of 2-6 carbons as a crosslinking agent in amounts of 5-15 parts by weight in relation to 100 parts by weight of the polyol component in the polyol composition, with a polyisocyanate in the presence of a crosslinking agent, a catalyst and a blowing agent.

* * * * *

UNITED STATES PATENT AND TRADEMARK OFFICE
CERTIFICATE OF CORRECTION

PATENT NO. : 5,225,453
DATED     : July 6, 1993
INVENTOR(S) : Satofumi YAMAMORI

It is certified that error appears in the above-identified patent and that said Letters Patent is hereby corrected as shown below:

Column 9,
Claim 2, line 2, before "adduct" insert --an--.
Column 10,
Claim 6, line 9, change "epresents" to --represents--.

Signed and Sealed this

Eighteenth Day of October, 1994

Attest:

BRUCE LEHMAN

Attesting Officer    Commissioner of Patents and Trademarks